Jan. 31, 1967 W. BUSCHBECK ETAL 3,302,133

CIRCUIT

Filed Jan. 2, 1962 3 Sheets-Sheet 1

INVENTORS
Werner Buschbeck &
Alfred Ruhrmann

BY George H. Spencer

ATTORNEY

INVENTORS
Werner Buschbeck &
Alfred Ruhrmann
BY George H. Spencer
ATTORNEY

CIRCUIT

Filed Jan. 2, 1962 3 Sheets-Sheet 3

INVENTORS
Werner Buschbeck &
Alfred Ruhrmann
BY George H. Spencer
ATTORNEY 3,302,133

CIRCUIT

Werner Buschbeck, Ulm (Danube), and Alfred Ruhrmann, Berlin-Tempelhof, Germany, assignors to Telefunken Patentverwertungs-G.m.b.H., Ulm (Danube), Germany Filed Jan. 2, 1962, Ser. No. 175,381
Claims priority, application Germany, Jan. 3, 1961, T 19,497
18 Claims. (Cl. 333—8)

Figures 1, 2, 3:
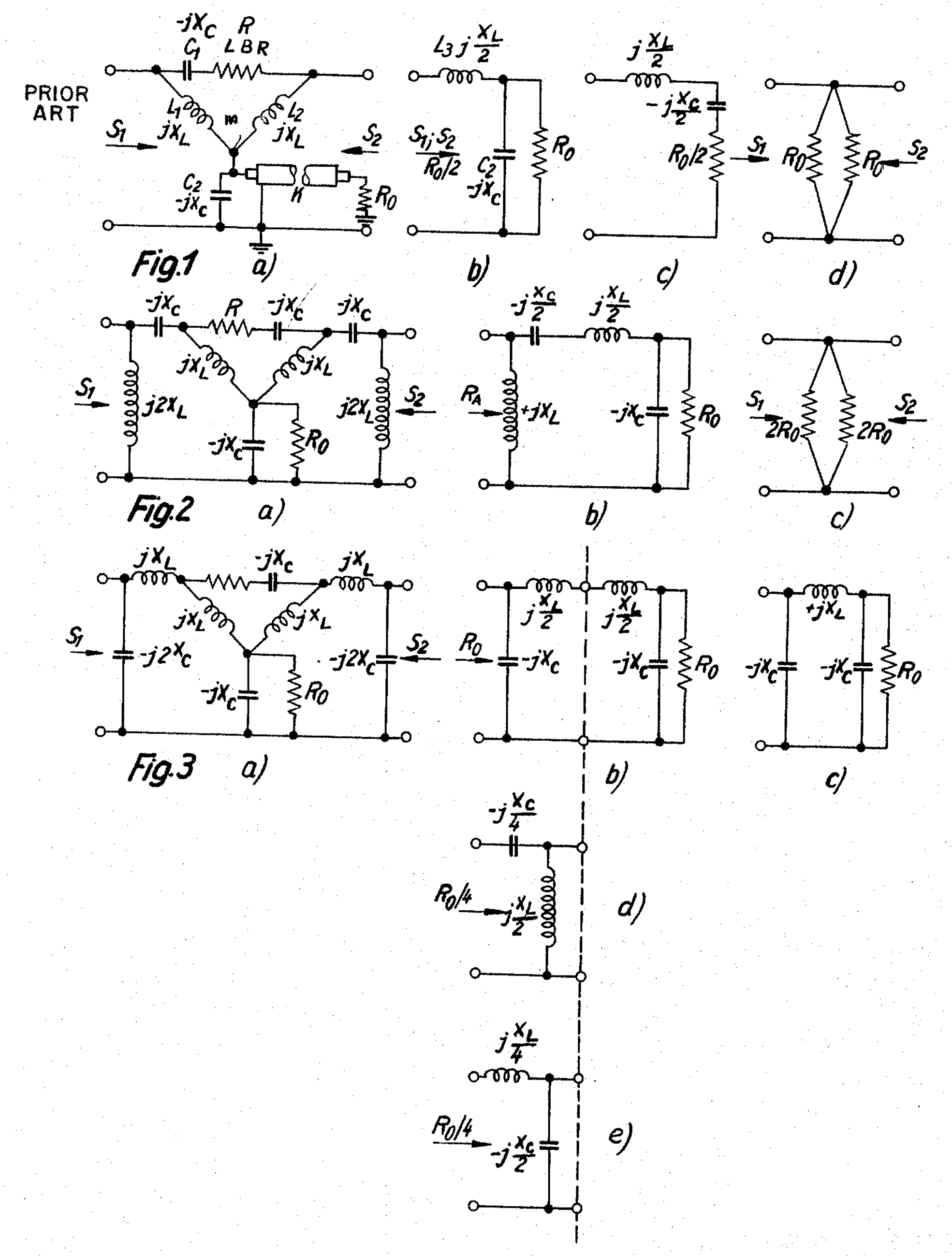

The present invention relates generally to a circuit for feeding a common load circuit, and, more particularly, to a tuned antenna circuit which appears as a series or parallel resonant circuit and which is fed by two high frequency generators.

German Patent No. 954,887 describes a circuit which is suitable for this purpose and wherein the two generators are decoupled from each other, i.e., they do not have a reactive effect upon each other as long as the terminal resistance of the circuit maintains its desired value. Thus, in a case of a communication transmitter, this would be the resistance of the antenna circuit.

FIGURE 1*a* illustrates this known circuit which will operate in the same manner even if the capacitances are changed into inductances of the same reactance, and vice versa. Communication transmitters $S_1$ and $S_2$ are connected to the left and right pairs of terminals, respectively, of the circuit device. The lower terminals of the two communication transmitters are directly connected together as well as with ground and with the outer conductor of the coaxial antenna feed line K. A voltage divider, comprising coils $L_1$ and $L_2$, is connected between the two upper terminals of the transmitters. The point of division *m* of the voltage divider is connected with the inner conductor of the coaxial line K, and is connected with ground via capacitor $C_2$. Antenna resistance $R_0$ is connected between the other end of the inner conductor of the coaxial line K and ground. Furthermore, the load balancing resistor LBR is connected in series with capacitor $C_1$ between the two upper generator terminals. All resistors and reactances have the same value of $R=X=R_0$, even the load balancing resistor LBR, as indicated in FIGURE 1*a*.

In comparison to other known bridge devices composed of $\lambda/4$ and $$3\frac{\lambda}{4}$$

lines ($\lambda$=wave length) or their equivalent circuits, the circuit of FIGURE 1*a* has the advantage that the two transmitters to be connected in parallel are completely equally loaded in every respect even during the transient periods of initial operation, due to the fact that the circuit device is symmetrical with respect to the terminals of the two transmitters.

If the two transmitters $S_1$ and $S_2$ operate with the same amplitude and phase, with their outputs connected to the bridge circuit provided for decoupling purposes, then both upper terminals have the same potential and the circuit branch containing the load balancing resistance LBR is inactive. Thus, the generator terminals of the in-phase generators may be considered as being connected with each other, whereupon the equivalent circuit according to FIGURE 1*b* is obtained. Converting the shunted portions of the circuit of FIGURE 1*b* into a series connection results in an equivalent circuit which is illustrated in FIGURE 1*c*. In this circuit, the reactances will compensate for each other so that only the resistance $R_0/2$ remains. This may be considered as a parallel connection of two resistors having a value $R_0$, each of which is fed by one of the two transmitters, as illustrated in FIGURE 1*d*.

According to the circuit of FIGURE 1*b*, switching the bridge device into a line has the corresponding effect of a low-pass half member or inverted L-type filter section having a 45° phase angle. In those cases where the length of the line between the generator and the load circuit must be balanced or adjusted to a definite length, and preferably to, $$n\frac{\lambda}{2}$$

this is disadvantageous because the condition is disturbed by switching the bridge device into and out of operation. Therefore, bridge devices are desirable for mutually decoupling generators wherein the phase angle is not 45°, but is 0° or 180°. Bridge devices having a 90° phase angle and thus a $\lambda/4$, characteristic are also suitable since they may be supplemented by using a further $\lambda/4$ member to provide a 180° or 0° phase angle.

With respect to the balancing or adjustment of the line between the generator and the load circuit to a definite length as mentioned above, reference may be had to German Patent No. 940,717, wherein it is taught that such balancing provides more favorable conditions during the transient periods of initial operation. These processes are particularly noticeable in communication transmitters which operate with weakly damped antenna circuits. This patent teaches that the electric length of the coupling network, including the line between the output tube stage of the transmitter and the load circuit, should be chosen to be equal to an even numbered multiple of $\lambda/4$ if the load circuit has the characteristic of a parallel resonant circuit. On the other hand, the electric length of the coupling network including the line should be chosen to be an odd numbered multiple of $\lambda/4$ if the load circuit has the characteristic of a series resonant circuit. Thus, the balancing of the line length is disturbed if the bridge operated in parallel is to be switched in and switched out without any noticeable interruption of operation. This switching in and out of the bridge is frequently required during practical operating conditions. Switching a line out of a bridge operating in parallel is required when one of the two transmitters has failed and it is determined that this failure will be of fairly long duration.

With this knowledge of the prior art in mind, it is a main object of the present invention to use the aforementioned circuit device already recognized as advantageous, and improve upon it whereby the phase angle thereby provided will be 0° or 180°.

A further object of the invention is to provide a bridge circuit in which the change-over to individual transmitter operation without the bridge is possible in a few tenths of a second by a simple switching process without retuning or rebalancing the line.

These objects and others ancillary thereto are accomplished according to preferred embodiments of the invention, wherein the known bridge circuit device for feeding a common load circuit is provided, and preferably an antenna circuit appearing as a tuned series or parallel resonant circuit, and is fed by two high frequency generators of the same frequency and phase. The in-phase terminals of the generators are connected with one another and with one terminal of the load circuit or with the outer conductor of a coaxial high frequency line connected with the load circuit, as well as preferably with ground. The other in-phase terminals have a voltage divider provided therebetween which contains reactances of one type. The point of division of this voltage divider is connected with the other terminal of the load circuit and connected with a reactance of the other type, preferably in a parallel connection, or to which is connected the other conductor on the high frequency line mentioned.

According to the invention, the phase angle of the branches between the terminals of the two generators on the one hand, and the terminal of the load circuit or the line representing the load circuit on the other hand, is balanced by two supplementing circuits or stages on the input side of one supplementing circuit on the output side, which supplements the phase angle to an integral multiple of 180°, including the multiplier 0.

The circuit device of the present invention has a phase angle of 45° and would be positive with the circuit of FIGURE 1*a*. Since there is to be supplementing to a phase angle of 0° or 180°, or in a preliminary step, to 90°, a supplementing circuit should be used containing a member of the same or the inverse phase angle as the mentioned branches of the circuit device without having supplementation. Thus, the supplementing member may have a phase angle of +45° or −45°.

Additional objects and advantages of the present invention will become apparent upon consideration of the following description when taken in conjunction with the accompanying drawings in which:

FIGURES 1*a–d* are circuit diagrams of a known bridge circuit and of circuits which are equivalent thereto.

FIGURES 2*a–c* are circuit diagrams of the bridge circuit and supplementing stages to provide a phase angle of 0°.

FIGURES 3*a–e* are circuit diagrams of the bridge circuit and supplementing stages to provide a phase angle of 90°.

FIGURES 4*a–f* are circuit diagrams of other embodiments of the invention.

FIGURES 5*a–f* are circuit diagrams of further embodiments of the invention.

With more particular reference to the drawings, FIGURE 2*a* illustrates a circuit arrangement similar to FIGURE 1*a*, that is, the central portion of the embodiment of FIGURE 2*a* is the same as that of FIGURE 1*a*. Supplementing stages are connected at the pairs of terminals which are connected with the transmitters and these stages include capacitors having the reactance $-jX_C$ and the coils having the reactance $j2X_L$. An equivalent circuit may be formed as indicated in FIGURE 2*b*, which is formed in the same manner as the equivalent circuits of FIGURE 1. This equivalent circuit of FIGURE 2*b* indicates that the phase angle of the supplemented circuit device is now 0°. However, the input resistance no longer has the desired value of $R_0/2$ but has changed to $R_0$. This is indicated in the equivalent circuit of FIGURE 2*c* which shows that each of the two transmitters $S_1$, $S_2$, must now operate on the output resistance $2R_0$.

The embodiment of FIGURE 3*a* provides circuit supplementation by means of a supplementing stage having the same phase angle as the branches of the bridge, in comparison to the supplementation of the circuit of FIGURE 2*a* wherein the supplementing stage provided the inverse phase angle. The supplementing stages on the input side include coils having the reactance $jX_L$ and capacitors having a reactance $-j2X_C$. The supplementing circuits according to FIGURES 3*b* and 3*c* indicate by use of equivalent circuits that the resulting device has a phase angle of +90° which, by a further stage, may easily be adjusted to a phase angle of 0° or 180°. However, the input resistance again has the undesirable value $R_0$.

FIGURES 3*d* and 3*e* which are represented as circuits which are equivalent to that of FIGURE 3*b*, indicate other circuit arrangements for providing supplemental stages to the bridge circuit. In the embodiment of FIGURE 3*d*, the resulting phase angle is 0°. However, the input resistance at the transmitter input terminals, which are assumed to be connected in parallel, becomes $R_0/4$. The same input resistance results for the embodiment of FIGURE 3*e*, wherein the phase angle of the total circuit is +90°.

In a further feature of this invention, the input resistances of the equivalent circuits according to FIGURES 2*b*, 3*b*, 3*d* and 3*e* which do not correspond to the desired value of $R_0/2$, have members for transforming these resistances to the desired value. This is accomplished by providing a further stage for transforming the input resistance to the value of the adjusted resistance of the device, which input resistance was changed by the effect of the supplementing stage which is connected to the bridge circuit to supplement the phase angle, as mentioned in the description above.

Figure 4:
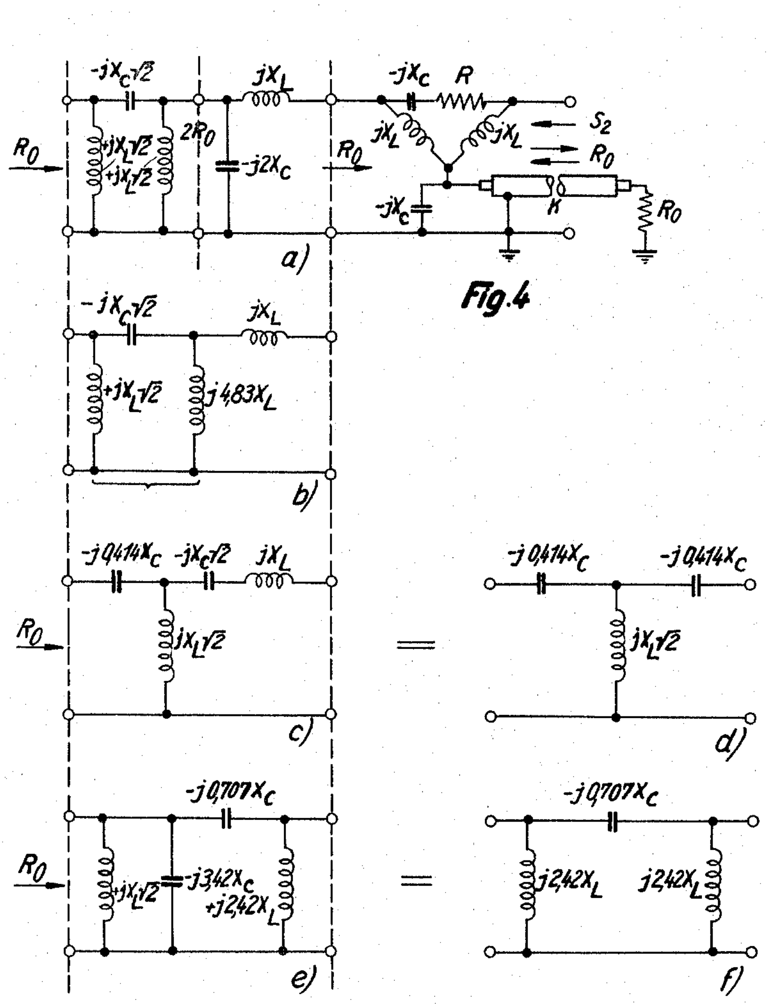

FIGURES 4*a* to 4*f* illustrate embodiments of circuits which are designed according to this feature of the invention. In the embodiment of FIGURE 4*a*, only the supplementing stage on the left of the circuit device for the two transmitters operating in parallel is shown. An identical supplementing stage will be connected on the right side to the terminals of the transmitter $S_2$. A low-pass L-type filter section is provided as the supplementing stage for supplementing the bridge circuit to a phase angle of 90° in a manner similar to that of the embodiment illustrated in FIGURE 3*a*. The input resistance is equal to $2R_0$ and is therefore not suitable for connection to the transmitter. Therefore, to transform this to the value $R_0$, a high-pass $\lambda/4$ member is connected on the input side. This member has a phase angle of −90° and supplements the total circuitry to a 0° phase angle.

A high-pass member at this point is more advantageous than a low-pass member. A low-pass member would result in supplementing to a resulting phase angle of 180°, whereas with a high-pass member as the transforming member the reactive power requirement and thus the expense becomes smaller. This will be recognized by the fact that a coil having a reactance of $+jX_L\sqrt{2}$ is connected in parallel with a capacitor having the reactance $-j2X_C$ of the supplementing stage, wherein the coil largely compensates the capacitor. The circuit must always be considered at one particular frequency and therefore the balancing of the reactances against one another is allowable in this case. For any other frequency, alteration of all of the elements would be necessary.

In order to simplify the circuit, these two elements which are disposed in parallel are united to form a single element, as shown in FIGURE 4*b*. Also, the mesh connection indicated in FIGURE 4*b* by a bracket may be converted into a star connection. By doing this the equivalent circuitry of FIGURE 4*c* will result wherein the two longitudinal elements directly connected in series may be combined to form a single element shown in FIGURE 4*d*. The star connection which is not particularly identified in FIGURE 4*c* may be transformed into an equivalent mesh connection, as indicated in FIGURE 4*e* wherein the two parallel elements on the left hand side may be combined as indicated in FIGURE 4*f*.

Further combinations of the supplementing stage elements at the input side, for example, with the input elements of the bridge circuit, are not possible due to the fact that the input elements of the bridge circuit are not grounded. However, the capacitor $C_2$ of FIGURE 1*a* having the reactance $-jX_C$ on the output side of the bridge is grounded. Therefore, the supplementing stage to be designed in accordance with the present invention is expediently arranged on the output side of the bridge. Using the supplementing stage on the output side requires only one supplementing stage or circuit, which may be reduced to two circuit elements, as will be indicated below. On the other hand, where the supplementing is done on the input side as indicated in FIGURE 4*f* three circuit elements are necessary on each side and thus altogether six circuit elements are needed.

Figure 5:
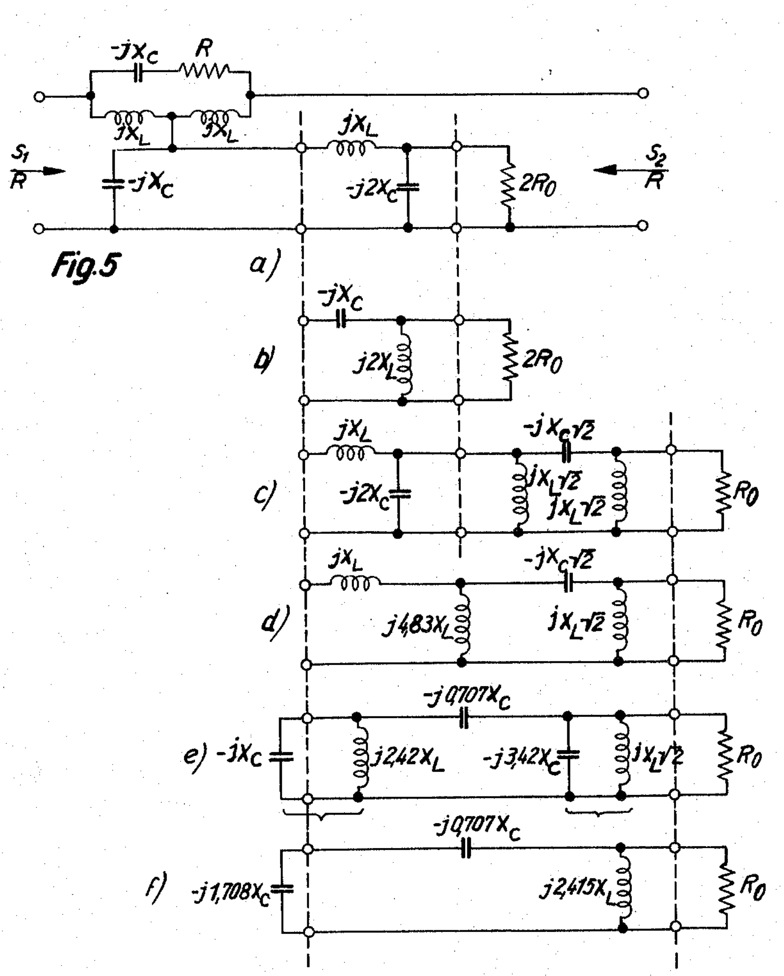

The embodiment of FIGURE 5*a* illustrates a circuit for use with two transmitters operating in parallel according to FIGURE 1*a* which is supplemented with the use of an inverted L-type filter section with a series reactance $jX_L$ and a parallel reactance $-j2X_C$ provided on the output side. The supplementing stage is a low-pass inverted L-type filter section which brings the phase angle between the terminals of the transmitters $S_1$ and $S_2$ and the terminal of the load circuit to 90°. However, due to the transformation effect there is the undesirable consequence that the load resistance in this case must have a value of $2R_0$. In this case, just as in the case of the supplementing stage being located on the input side, an extension or expansion of the supplementing stage by a transforming member with a transformation ratio of 1:2 is indicated.

FIGURE 5*b* illustrates an embodiment wherein the supplementing stage has a high-pass characteristic. In this case, the resulting phase angle will be 0° while the output resistance will be equal to $2R_0$, just as in the embodiment of FIGURE 5*a*. This embodiment of FIGURE 5*b* will not be considered any further.

The embodiment of FIGURE 5*c*, therefore, refers to the embodiment according to FIGURE 5*a*, and illustrates an additional transforming member inserted into the circuit for translating the load resistance $R_0$ to the value $2R_0$ which is necessary for the circuit of FIGURE 5*a*. The transforming member is a high-pass member having a characteristic impedance of $R\sqrt{2}$. By forming equivalent circuits according to FIGURES 5*d*, 5*e*, and 5*f*, it may be reduced to a total of three reactance elements. First, as shown in FIGURES 5*c* and 5*d*, the capacitor $-j2X_C$ is combined with the coil $jX_L\sqrt{2}$ to form a single element which is a coil having a reactance $j4.83X_L$. In FIGURE 5*e*, the elements are shown which result in a mesh connection which is equivalent to the star connection shown in the left portion of FIGURE 5*d*. Two parallel reactances as indicated by the brackets may be combined and will then result in the circuit illustrated in FIGURE 5*f*. The capacitor $-jX_C$ indicated on the left side of FIGURE 5*e*, is the capacitor $C_2$ of FIGURE 1*a*.

Since this additional transforming four-terminal network of FIGURE 5*c* is a high-pass member having a phase angle of −90°, the total circuit will have a phase angle of 0°. Only a small expense is involved since according to FIGURE 1*a* only two circuit elements, a capacitor with a reactance $-j0.707X_C$ and a coil with a reactance $j2.415X_L$ are required in addition to the original circuit.

In the same manner, the circuit according to FIGURE 5*b* may also be similarly expanded by use of equivalent circuits to form a final simple circuit. Also, the additional transformation according to FIGURE 5*c* may be accomplished by λ/4 members of a different type. The results differ with respect to the expense involved, but are about equivalent in their electrical effects.

The complete symmetry of the two transmitter inputs of the bridge circuit may be more easily accomplished by using the supplementing stage on the output side rather than on the input side, since in the former case the symmetry depends only on the correct balancing of the two coils $L_1$ and $L_2$ of the bridge, whereas when the supplementing stage is used on the input side, all the elements of the two supplementing circuits affect the symmetry conditions. The purpose for having complete symmetry of the two transmitter inputs is taught in German Patent No. 940,717 and is for the purpose of improving the signals even during the transient periods of initial operation, and thus for all load resistances between 0 and infinity which are encountered in the course of these processes.

If members are provided in the line between the output tube stage of a transmitter and the load circuit, in connection with the parallel connected bridge, which members have lengths which are neither equal to λ/4 nor λ/2, for example, the antenna cable K, such members may be appropriately combined with the supplementing stage of the parallel connected bridge. The phase angle of the supplementing stage would then be chosen so that the phase angle of both elements together corresponds to an integral multiple of 90°.

It will be understood that the above description of the present invention is susceptible to various modifications, changes, and adaptations, and the same are intended to be comprehended within the meaning and range of equivalents of the appended claims.

What is claimed is:

1. A circuit device which is asymmetrical with respect to ground for feeding a common load circuit, such as an antenna circuit appearing as a tuned circuit, from two high frequency (HF) generators with the same frequency and phase, said circuit device comprising, in combination:

(a) a first pair of terminals for connection with one HF generator;

(b) a second pair of terminals for connection with another HF generator;

(c) a bridge circuit having a phase angle other than an integral multiple of 180°, including the multiple 0, and including (1) a load circuit, one corresponding terminal from each pair being connected together and with one side of said load circuit and to ground, and a load balancing resistance, (2) a voltage divider including reactance elements of one type connected between other corresponding terminals from each pair, the point joining said reactance elements being connected to the other side of said load circuit, and (3) a reactance element of the other type connected with said voltage divider; and (d) at least one supplementing stage connected with said bridge circuit for making the phase angle between the two generators and the load circuit equal to an integral multiple of 180° including the multiplier 0.

2. A device as defined in claim 1, wherein said reactance element of the other type is connected in parallel with said load circuit.

3. A device as defined in claim 1, wherein said reactance element of the other type is connected in parallel with said voltage divider.

4. A device as defined in claim 1, wherein said stage includes an element having the same phase angle as said bridge circuit.

5. A circuit device which is asymmetrical with respect to ground for feeding a common load circuit, such as an antenna circuit appearing as a tuned circuit, from two high frequency (HF) generators with the same frequency and phase, said circuit device comprising, in combination:

(a) a first pair of terminals for connection with one HF generator;

(b) a second pair of terminals for connection with another HF generator;

(c) a bridge circuit including (1) a load circuit, one corresponding terminal from each pair being connected together and with one side of said load circuit and to ground, (2) a voltage divider including reactance elements of one type connected between other corresponding terminals from each pair, the point joining said reactance elements being connected to the other side of said load circuit, and (3) a reactance element of the other type connected with said voltage divider; and (d) at least one supplementing stage connected with said bridge circuit for making the phase angle between the two generators and the load circuit equal to an integral multiple of 180° including the multiplier 0, said stage including an element having the inverse phase angle as said bridge circuit.

6. A device as defined in claim 1, wherein two supplementing stages are provided and each is arranged in an input section of said bridge circuit.

7. A device as defined in claim 1, wherein only a single supplementing stage is provided and arranged in an output section of said bridge circuit.

8. A device as defined in claim 5, comprising a transforming stage for transforming the input resistance of the device, which is changed by said supplementing stage, to the value of the terminal resistance, each of said stages including two reactance elements common to both stages.

9. A circuit device which is asymmetrical with respect to ground for feeding a common load circuit, such as an antenna circuit appearing as a tuned circuit, from two high frequency (HF) generators of the same frequency and phase, said circuit device comprising, in combination:

(a) a first pair of terminals for connection with one HF generator;

(b) a second pair of terminals for connection with another HF generator;

(c) a bridge circuit including (1) a load circuit, one corresponding terminal from each pair being connected together and with one side of said load circuit and to ground, (2) a voltage divider including reactance elements of one type connected between other corresponding terminals from each pair, the point joining said reactance elements being connected to the other side of said load circuit, and (3) a reactance element of the other type connected with said voltage divider; and (d) at least one supplementing stage connected with said bridge circuit for making the phase angle between the two generators and the load circuit equal to an integral multiple of 180° including the multiplier 0, and (e) a transforming stage for transforming the input resistance of the device, which is changed by said supplementing stage, to the value of the terminal resistance.

10. A device as defined in claim 9, wherein said supplementing stage is an L-type filter section.

11. A device as defined in claim 9, wherein said transforming stage is a $\pi$-type filter section.

12. A device as defined in claim 9, wherein said transforming stage is an L-type filter section.

13. A device as defined in claim 9, wherein said transforming stage is arranged to have a phase angle of 90°.

14. A device as defined in claim 9, wherein said supplementing and transforming stages include reactance elements common to said stages.

15. A device as defined in claim 12, wherein three reactance elements are common to said supplementing stage and said transforming stage.

16. A device as defined in claim 9, wherein said supplementing stage is an L-type filter section connected with said transforming stage which is a high-pass element having a phase angle of −90°.

17. A circuit device which is asymmetrical with respect to ground for feeding a common load circuit, such as an antenna circuit appearing as a tuned circuit, from two high frequency (HF) generators of the same frequency and phase, said circuit device comprising, in combination:

(a) a first pair of terminals for connection with one HF generator;

(b) a second pair of terminals for connection with another HF generator;

(c) a bridge circuit including (1) an HF line connected with a load circuit and having an outer conductor and an inner conductor, one corresponding terminal from each pair being connected together and with said outer conductor and to ground, (2) a voltage divider including reactance elements of one type connected between other corresponding terminals from each pair, the point joining said reactance elements being connected to said inner conductor, and (3) a reactance element of the other type connected with said voltage divider; and (d) at least one supplementing stage connected with said bridge circuit for making the phase angle between the two generators and the line connected to a load circuit equal to an integral multiple of 180° including the multiplier 0.

18. In a circuit device which is asymmetrical with respect to ground for feeding a common load circuit, such as an antenna circuit appearing as a tuned circuit, from two high frequency (HF) generators of the same frequency and phase, said circuit device including a first pair of terminals for connection with one HF generator, a second pair of terminals for connection with another HF generator, and a bridge circuit including a HF line connected with a load circuit and having an outer conductor and an inner conductor, one corresponding terminal from each pair being connected together and with said outer conductor and to ground, a voltage divider including reactance elements of one type connected between other corresponding terminals from each pair, the point joining the reactance elements being connected to the other side of the load circuit, and a reactance element of the other type connected with the voltage divider; the improvement comprising: at lease one supplementing stage connected with the bridge circuit for making the phase angle between the two generators and the load circuit equal to an integral multiple of 180° including the multiplier 0.

References Cited by the Examiner

UNITED STATES PATENTS

| | | | |
|---|---|---|---|
| 2,107,025 | 2/1938 | Buschbeck et al. | 333—25 |
| 2,280,282 | 4/1942 | Colchester | 333—74 |
| 2,410,114 | 10/1946 | Tyrrell | 333—9 |
| 2,416,790 | 3/1947 | Barrow | 333—32 |
| 2,445,895 | 7/1948 | Tyrrell | 333—9 |
| 2,774,069 | 12/1956 | Parker | 333—74 |

FOREIGN PATENTS

| | | |
|---|---|---|
| 532,619 | 1/1941 | Great Britain. |
| 861,865 | 1/1953 | Germany. |
| 914,636 | 7/1954 | Germany. |
| 954,887 | 12/1956 | Germany. |

HERMAN KARL SAALBACH, *Primary Examiner.*

E. LIEBERMAN, C. BARAFF, *Assistant Examiner.*